United States Patent [19]

Samek

[11] Patent Number: 4,683,755
[45] Date of Patent: Aug. 4, 1987

[54] BIAXIAL STRAIN GAGE SYSTEMS

[75] Inventor: Norbert E. Samek, Sierra Madre, Calif.

[73] Assignee: IMO Delaval Inc., Lawrenceville, N.J.

[21] Appl. No.: 798,476

[22] Filed: Nov. 15, 1985

[51] Int. Cl.$^4$ .............................................. G01L 7/08
[52] U.S. Cl. ................................ 73/727; 29/610 SG; 73/777
[58] Field of Search ........................ 73/727, 721, 777; 29/610 SG, DIG. 17; 338/4, 22 SD, 42

[56] References Cited

U.S. PATENT DOCUMENTS

| | | | |
|---|---|---|---|
| 3,456,226 | 7/1969 | Vick | 338/4 X |
| 3,537,319 | 11/1970 | Yerman | 73/727 |
| 3,772,628 | 11/1973 | Underwood et al. | 338/4 |
| 3,805,601 | 4/1974 | Jeffers | 73/777 |
| 4,173,900 | 11/1979 | Tanabe et al. | 73/727 |
| 4,275,406 | 6/1981 | Muller et al. | 338/4 X |
| 4,317,126 | 2/1982 | Gragg, Jr. | 338/4 X |
| 4,327,350 | 4/1982 | Erichsen | 73/727 X |
| 4,439,752 | 3/1984 | Starr | 73/727 X |

Primary Examiner—Jerry W. Myracle
Attorney, Agent, or Firm—Benoit Law Corporation

[57] ABSTRACT

Biaxial strain gage and similar systems include or provide a substrate of semiconductor material having cubic unit cells and an absolute value of piezoresistive coefficient in a first direction different from an absolute value of piezoresistive coefficient in a second direction transverse to said first direction. A first strain gage has a dominant dimension oriented in the above mentioned first direction and is diffused into the substrate. A second strain gage has a dominant dimension in the above mentioned second direction and is diffused into the substrate. A pressure responsive diaphragm having a central area displaying essentially symmetrical biaxial strains is provided, and the substrate is attached in said central area to the diaphragm to expose the gages to the biaxial strains. Additionally, third and fourth strain gages may also be provided, but in either case, all strain gages are located within an area of the substrate corresponding to the central area of the diaphragm displaying essentially symmetrical biaxial strains.

22 Claims, 4 Drawing Figures

BIAXIAL STRAIN GAGE SYSTEMS

BACKGROUND OF THE INVENTION

1. Field of the Invention

The subject invention relates to strain gages, to transducers, and to methods of making strain gages and tranducers, including strain gages and transducers of semiconductor material.

2. Information Disclosure Statement

The following disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness and inasmuch as a growing attitude appears to require citation of material which might lead to a discovery of pertinent material though not necessarily being of itself pertinent. Also, the following comments contain conclusions and observations which have only been drawn or become apparent after conception of the subject invention or which contrast the subject invention or its merits against the background of developments which may be subsequent in time or priority.

The change of resistance of diffused silicon resistors with strain is a phenomenon well known and utilized for semiconductor strain gages. The magnitude of resistance change depends on the strain level, on the doping concentration and type and on the crystallographic orientation of the gages. For a given doping level the resistance change is given by the following equation:

$$\frac{\Delta R}{R_o} \simeq \sigma(\pi_L + \pi_T) \quad (1)$$

Where
  $\Delta R$ = resistance change
  $R_o$ = gage resistance
  $\sigma$ = stress
  $\pi_L$ = longitudinal piezoresistive coefficient
  $\pi_T$ = transverse piezoresistive coefficient For P-type gages (with hole conductivity) tension will cause a positive resistance change, compression a negative change.

For N-type gages (with electron conductivity) tension will cause a negative resistance change. Compression will cause a positive change.

The highest longitudinal piezoresistive coefficient is obtained if the gages are oriented in the <1-1-1> crystallographic direction. This is the reason why many of the diffused silicon devices or also bulk silicon bar gages are using (1-1-0) silicon wafers with gages oriented in the <1-1-1> direction. A pressure sensing device utilizing similar strain gages is arranged in the form of a diaphragm or a beam which deform by application of pressure in such a way that two gages are in tension and two gages in compression, all connected in Wheatstone bridge configuration. The changes in resistance are causing a change in zero of the bridge proportional to the pressure. A half bridge with one gage in tension and one in compression is also possible. The value of the piezoresistive coefficients in the <1-1-1> orientation is:

$$\pi_L = \frac{1}{3}(\pi_{11} + 2\pi_{12} + 2\pi_{44}) \quad (2)$$

$$\pi_T = \frac{1}{3}(\pi_{11} + 2\pi_{12} - \pi_{44}) \quad (3)$$

The value of $\pi_{11}$ and $\pi_{12}$ is very small compared to $\pi_{44}$. Therefore, we can approximate the piezoresistive coefficients as:

$$\pi_L = \frac{2}{3}\pi_{44} \quad (4)$$

$$\pi_T = -\frac{1}{3}\pi_{44} \quad (5)$$

We can see that the value of the transverse piezoresistive coefficient is only 50% of the longitudinal one.

For many pressure sensor applications it is desirable to use (1-0-0) silicon because of its crystallographic symmetry permitting to etch symmetrical shapes. The <1-1-0> direction gives the highest piezoresistive coefficient in the (1-0-0) plane. The values of the piezoresistive coefficients are:

$$\pi_L = \frac{1}{2}(\pi_{11} + \pi_{12} + \pi_{44}) \quad (6)$$

$$\pi_T = \frac{1}{2}(\pi_{11} + \pi_{12} - \pi_{44}) \quad (7)$$

and when neglecting $\pi_{11}$ and $\pi_{12}$ as very small compared to $\pi_{44}$:

$$\pi_L = \frac{1}{2}\pi_{44} \quad (8)$$

$$\pi_T = -\frac{1}{2}\pi_{44} \quad (9)$$

The values $\pi_L$ and $\pi_T$ are the same only with opposite signs and with absolute value 25% lower than for the <1-1-1> direction.

The fact that the values of $\pi_L$ and $\pi_T$ are identical with opposite signs can be used with advantage for sensor configurations where one or two gages are in longitudinal tension (compression) and one or two gages in transverse tension (compression) again connected in a Wheatstone bridge configuration which changes zero with pressure.

The above applies both for diffused gages and for so-called bar gages etched out of bulk silicon wafers and epoxy or glass bonded to the surface of a metal diaphragm or beam. Whatever the configuration, we try to place the gages always in an area with a predominantly uniaxial stress, with one or two gages of the bridge in tension and one or two gages of the bridge in compression.

Because of the symmetry of the cubic cell it is understood that plane (1-0-0) can mean any of the base planes of unit cell (010,001, $\bar{1}$00, 0$\bar{1}$0, 00$\bar{1}$) and direction <1-0-0> can mean any direction perpendicular to above base planes. The same applies for planes and directions (1-1-0) and <1-1-1>.

For a calculation of values of piezoresistive coefficients, reference may be had to *Integrated Silicon Device Technology*, Vol. V, by Research Triangle Institute, Publication #AD605558 (July 1964).

An article by W. G. Pfann, R. N. Thurston, entitled *Semiconductor Stress Transducers Utilizing Shear Piezoresistance Effects,* Journal of Applied Physics, Vo. 32, No. 10 (Oct. 1961), pp. 2008–2019, also provides calculations of piezoresistive coefficients. The 110/100 orientation of gages is mentioned as "insensitive to transverse stresses" and a bridge for a load cell is proposed which would be sensitive only to stresses parallel to one arm of the bridge. All configurations are explored only for load cell applications and torsion load cells.

An article by A. C. M. Gieles, G. H. J. Somers, entitled *Miniature Pressure Transducers With A Silicon Diaphragm,* Philips Tech. Review, 33, No. 1 (1973), pp. 14–20, deals with a (110/001) configuration of gages for a diffused and back-etched diaphragm configuration (silicon diaphragm). The purpose was to enable bringing all four gages as close together as possible and thus minimizing the effect of temperature changes on bridge balance. The idea has been apparently rejected for two reasons: Strong direction dependent mechanical stress in the (110) plane affecting the very thin diaphragm and the stability of the gage and because of variable contact resistance ("junction resistance") of the pads in the highly strained part of the diaphragm. This led to the use of diaphragms parallel to the (111) plane and gages in <110> direction (tension and compression).

SUMMARY OF THE INVENTION

It is a general object of this invention to overcome the disadvantages and to meet the needs expressed or implicit in the above Information Disclosure Statement or in other parts hereof.

It is a germane object of the invention to provide improved methods for making sensing devices.

It is a germane object of the invention to provide improved sensing devices.

It is also an object of this invention to provide improved semiconductor bridge circuits.

It is a related object of this invention to provide improved diffused semiconductor strain gages.

Other objects of the invention will become apparent in the further course of this disclosure.

From one aspect thereof, the invention resides in a method of making a sensing device, comprising in combination the steps of providing a substrate of semiconductor material having cubic unit cells and an absolute value of piezoresistive coefficient in a first direction different from an absolute value of piezoresistive coefficient in a second direction transverse to that first direction, providing a first strain gage with a dominant dimension oriented in that first direction and diffusing that first strain gage into the substrate, providing a second strain gage with a dominant dimension in the second direction and diffusing that second strain gage into the substrate, providing a pressure responsive diaphragm having a central area displaying essentially symmetrical biaxial strains, the first and second strain gages being located within an area of the substrate corresponding to the central area of the diaphragm displaying essentially symmetrical biaxial strains, and attaching the substrate in that area to the diaphragm at an orientation exposing the gages to the biaxial strains.

From a related aspect thereof, the subject invention resides also in a sensing device, comprising, in combination, a substrate of semiconductor material having cubic unit cells and an absolute value of piezoresistive coefficient in a first direction different from an absolute value of piezoresistive coefficient in a second direction transverse to that first direction, a first strain gage having a dominant dimension oriented in that first direction and being diffused into the substrate, a second strain gage having a dominant dimension in the second direction and being diffused into the substrate, a pressure responsive diaphragm having a central area displaying essentially symmetrical biaxial strains, and means for affixing the substrate to the diaphragm in that area at an orientation exposing the gages to the biaxial strains.

BRIEF DESCRIPTION OF THE DRAWINGS

The subject invention and its various objects and aspects will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figure 1:
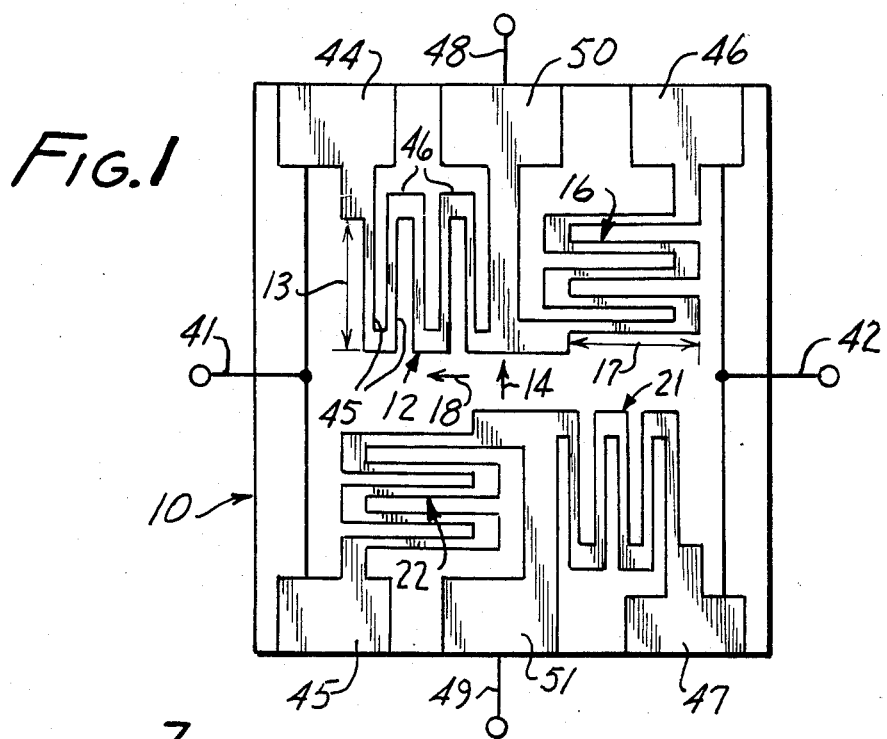
FIG. 1 is a plan view of a semiconductor chip having strain gages arranged in a Wheatstone bridge configuration according to a preferred embodiment of the subject invention.

For many applications, it could be of advantage to have both gages of a half bridge or all four gages of a complete bridge placed in the center of a circular diaphragm. This would, for instance, enable replacement of four bar gages individually epoxy bonded to a surface of a metal diaphragm by a single chip with four diffused gages. Such and similar configurations would result not only in cost savings by eliminating the need for matching individual gages and by reducing handling, but also in a qualitative improvement by reducing hysteresis and improving stability by using a single "diffused bar gage chip" with larger contact area.

The subject invention provides solutions for meeting these needs.

By way of background, the stress in the center of a diaphragm in longitudinal and in transverse directions will be equal. When using (1-0-0) silicon, equations (8), (9) and (1) indicate a near zero resistance change under conditions of a symmetric biaxial stress. Essentially the same applies to other orientations in the (1-0-0) plane.

With respect to (1-1-0) silicon, equations (4), (5) and (1) give under conditions of biaxial stress the following resistance change with stress:

$$<1\text{-}1\text{-}1> \frac{\Delta R}{R_o} = \sigma \left( \frac{2}{3} \pi_{44} - \frac{1}{3} \pi_{44} \right) = \frac{\sigma}{3} \pi_{44} \tag{10}$$

$$<1\text{-}1\text{-}2> \frac{\Delta R}{R_o} = \sigma \left( -\frac{2}{3} \pi_{44} + \frac{1}{3} \pi_{44} \right) = -\frac{\sigma}{3} \pi_{44} \tag{11}$$

This means that a bridge with two gages oriented in the <1-1-1> direction of the (1-1-0) plane and two gages perpendicular in the <1-1-2> direction would work and the bridge output would be about 50% of the output of a configuration with two and two gages in uniaxial tension/compression, all oriented in the <1-1-1> direction.

Within the scope of the subject invention, still another solution is possible. In particular, if we place a gage in the <1-1-0> direction in a (1-1-0) plane the longitudinal and transverse piezoresistive coefficients are:

$$\pi_L = \frac{1}{2}(\pi_{11} + \pi_{12} + \pi_{44}) \quad (12)$$

$$\pi_T = \pi_{12} \quad (13)$$

Again the values $\pi_{11}$ and $\pi_{12}$ are negligible compared to $\pi_{44}$ and we can write:

$$\pi_L \cong \frac{1}{2}\pi_{44} \quad (14)$$

$$\pi_T \cong 0 \quad (15)$$

The above means that if we make a diffused bridge with two gages oriented in <1-1-0> direction and two gages perpendicularly in the <1-0-0> direction of the (1-1-0) plane in a biaxially symmetrically stressed area, the resistance changes of the gages are:

$$<1-1-0> \frac{\Delta R}{R_o} = \frac{1}{2}\sigma\pi_{44} \quad (16)$$

$$<1-0-0> \frac{\Delta R}{R_o} = -\frac{1}{2}\sigma\pi_{44} \quad (17)$$

The output of such a bridge is the same as the output of a bridge in configuration with all gages in <1-1-0> direction of the (1-0-0) plane and working under conditions of uniaxial stress.

The subject invention, as well as preferred embodiments thereof, will now be explained with the aid of the drawings. In particular, FIG. 1 is a top view of a substrate or chip 10 of semiconductor material, having located thereon or therein a first strain gage 12 having a dominant dimension 13 oriented in a first direction 14, a further strain gage 16 having a dominant dimension 17 oriented in a second direction 18 at an angle to the first direction 14, a strain gage 21 having a dominant dimension oriented in the first direction 14, and a strain gauge 22 having a dominant dimension oriented in the second direction 18, all as shown in FIG. 1. These strain gages 12, 16, 21 and 22 preferably are diffused into the semiconductor material of the substrate or chip 10 as more fully described below.

The substrate of semiconductor material 10 has cubic unit cells and an absolute value of piezoresistive coefficient in the first direction 14 different from an absolute value of piezoresistive coefficient in the second direction 18 transverse to the first direction. Semiconductor materials having cubic unit cells are well known and include silicon and germanium.

Figure 2:
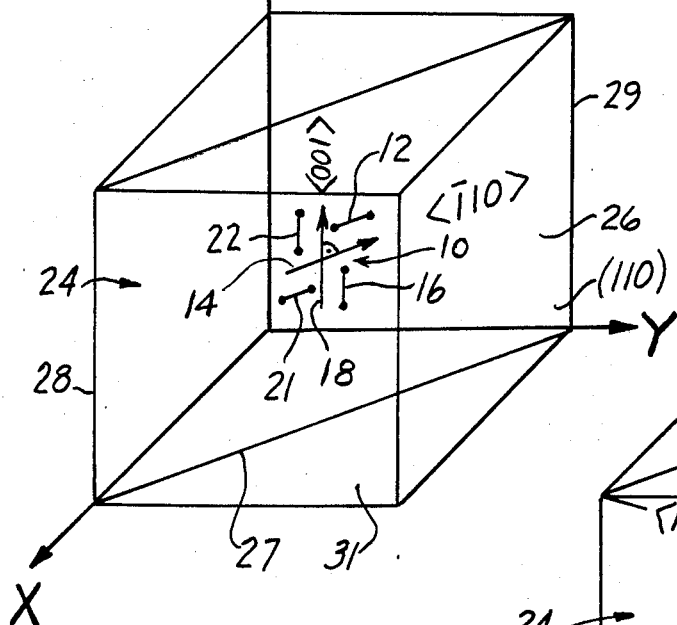
FIG. 2 is a perspective view of a cubic unit cell on an enlarged scale illustrating a first arrangement and orientation of the strain gages of FIG. 1 according to a preferred embodiment of the subject invention.
Figure 3:
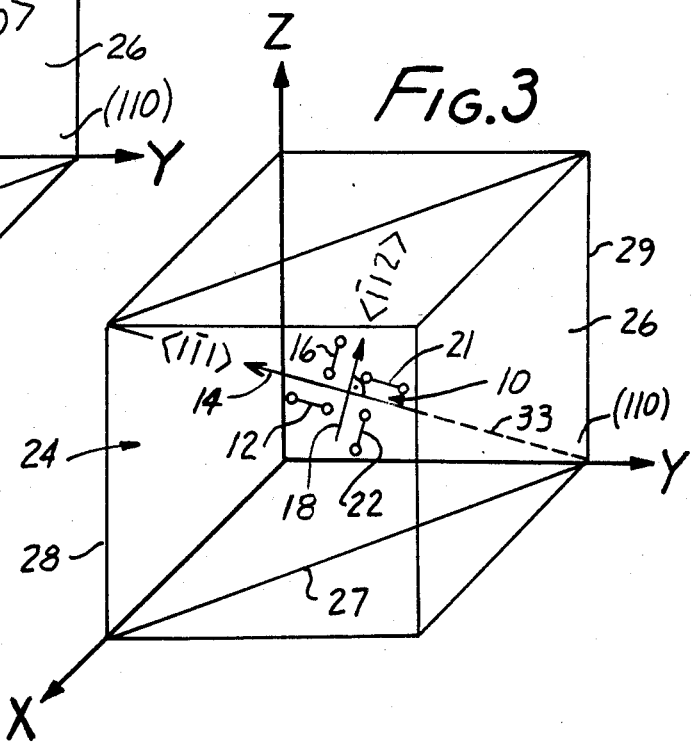
FIG. 3 is a view similar to FIG. 2 illustrating a second arrangement and orientation of the strain gages of FIG. 1 according to a further embodiment of the invention.

FIGS. 2 and 3 illustrate on an enlarged scale cubic unit cells of the semiconductor material in the substrate or chip 10. FIGS. 2 and 3 also show the strain gages 12, 16, 21 and 22 in a diagrammatic manner. For instance, the strain gage 12 is represented in FIGS. 2 and 3 by a thin strain gage resistor extending in the first direction, as shown at 13 and 14 in FIG. 1, while the strain gage 16 is represented by a thin strain gage resistor extending in the second direction 18, as shown at 17 and 18 in FIG. 1.

The same applies correspondingly to the diagrammatic representation of strain gages 21 and 22 in FIGS. 2 and 3.

In the preferred embodiments shown in FIGS. 2 and 3, the substrate of semiconductor material 10 is provided at a crystallographic orientation defined by a diagonal plane through the cubic unit cell, intersecting two opposite edges of that unit cell 24.

One of the gages 12 is oriented in diagonal plane 26 in parallel to an intersection of that diagonal plane 26 with a side 31 of the cubic unit cell 24, shown as diagonal 27, while another gage 16 is oriented in the diagonal plane in parallel to one of the edges 28 or 29 of the cubic unit cell 24.

In crystallographic terms, the first and third gages 12 and 21 are oriented with their dominant or longitudinal dimensions (13) in the <$\bar{1}$-1-0> direction of the (1-1-0) plane, while the second and fourth gages 16 and 22 are oriented in the <0-0-1> direction of the (1-1-0) plane 26 of the cubic unit cell 24.

For the sake of simplicity, the crystallographic directions have been shown in the drawings without intervening hyphens between the digits, and it is understood that 100 etc. stands for any of the corresponding equivalent crystallographic directions as explained above.

As may be seen from FIGS. 1 and 2, the crystallographic directions <0-0-1> and <1-1-0> extend in the directions 14 and 18, respectively.

According to the embodiment of the invention illustrated in FIG. 3, at least one of the gages 12 is oriented in the diagonal plane 26 in parallel to a body diagonal 33 of the cubic unit cell 24, while at least one other gage 16 is oriented in that diagonal plane 26 at right angles to the gage 12.

In crystallographic terms, the gages 12 and 21 are oriented in the <1-$\bar{1}$-1> direction of the (1-1-0) plane, while the gages 16 and 22 are oriented perpendicularly in the <$\bar{1}$-1-2> direction of the (1-1-0) plane 26.

From FIGS. 1 and 3, it may be seen that the crystallographic direction <1-$\bar{1}$-1> is parallel to the direction 14, while the crystallographic direction <$\bar{1}$-1-2> extends in parallel to the direction 18, or vice versa.

The illustrated preferred embodiment of the invention also provides a third strain gage 21 with a dominant dimension oriented in the first direction 14, and diffuses such third strain gage into the substrate 10. The illustrated embodiment further provides a fourth strain gage 22 with a dominant dimension oriented in the second direction 18, and diffuses such fourth strain gage into the substrate 10.

As seen in FIG. 2, the first and third strain gages 12 and 21 are oriented in the diagonal plane 26 in parallel to the intersection 27 of that diagonal plane 26 with a side 31 of the cubic unit cell 24, while the second and fourth strain gages 16 and 22 are oriented in the diagonal plane in parallel to one of the edges 28 or 29 of the cubic unit cell.

According to the embodiment illustrated in FIG. 3, the first and third strain gages 12 and 21 are oriented in the diagonal plane 26 in parallel to a body diagonal 33 of the cubic unit cell, while the second and fourth strain gages 16 and 22 are oriented in the diagonal plane at right angle to the first and third gage resistors.

In the embodiments illustrated in FIGS. 1 to 3, the second strain gage 16 is located adjacent the first strain gage 12, the third strain gage 21 is located adjacent the second strain gage 16 and across from the first strain gage 12, the fourth strain gage 22 is located adjacent the first and third strain gages 12 and 21 and across from the second strain gage 16, and the first strain gage 12 is located adjacent the fourth strain gage 22, as best apparent from FIG. 1.

Figure 4:
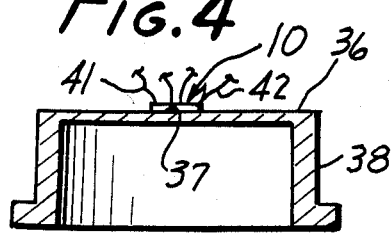
FIG. 4 is a side view, partially in section, of a transducer diaphragm assembly according to the subject invention.

As illustrated in FIG. 4, the invention further provides a pressure responsive diaphragm 36 having a central area 37 displaying essentially symmetrical biaxial strains. In this respect, reference may be had to conventional pressure transducer and similar literature, such as the above mentioned article by Gieles and Somers, for an explanation of symmetrical biaxial stress distribution in a transducer diaphragm, having distributed radial and tangential stress components extending, for instance, in the directions 14 and 18, or $<1\text{-}0\text{-}0>$ and $<\bar{1}\text{-}1\text{-}0>$, or $<1\text{-}\bar{1}\text{-}1>$ and $<\bar{1}\text{-}1\text{-}2>$, respecitvely. In other words, the substrate 10 is attached to the area 37 of the diaphragm to expose the gages 12, 16, 21 and 22 to symmetrical biaxial strains occurring in that diaphragm area 37.

As illustrated in FIG. 4, the substrate 10 is provided in the form of a chip located in and bonded to a center region 37 of the diaphragm 36 including the above mentioned area displaying essentially symmetrical strains of subjecting the strain gages 12, 16, 21 and 22 to biaxial stress. The diaphragm 36 is, for instance, of stainless steel, or a similar material which can be coated with a dielectric film, if dielectric isolation is required. Alternatively, the diaphragm could be of glass, sapphire or similar insulating material.

Viewing FIGS. 1 and 4 with each other, it is seen that all strain gages 12, 16, 21 and 22 are located within an area of the substrate 10 corresponding to the central area 37 of the diaphragm 36 displaying the essentially symmetrical biaxial strains.

Contrary to the problems encountered with prior-art pressure transducers using thin silicon diaphragms, the subject invention facilitates isolation against aggressive media, protection against overpressure, and provision of large-area diaphragms for low-pressure transducers.

The diaphragm 36 may be mounted on or be integral with a rim 38 which, in turn, may be part of a transducer in which pressure or another physical variable is made to bear on the diaphragm to impart biaxial strains on the chip 10 and thereby on the strain gages thereon.

The strain gages may be connected in a Wheatstone bridge configuration, having input leads 41 and 42 connected to bridge terminals 44 and 45, and 46 and 47, respectively, and having output leads 48 and 49 connected to bridge output terminals 50 and 51 for providing an electric signal proportional to, or indicative of, pressure or another variable to which the diaphragm and strain gages are subjected. Conventional balancing and temperature compensation techniques may be applied to the strain gage bridge. Also, the assembly shown in the drawings may be included in a transducer (not shown) for measuring or monitoring pressure or another variable exposing the gages 12, 16, 21 and 22 to strain.

In the practice of the subject invention, not all of the legs of the Wheatstone bridge need to include strain gages. For instance, a half-bridge could be realized and employed by providing strain gages 12 and 16 and substituting fixed resistors for the strain gages 21 and 22.

The chip 10 as shown in FIG. 4 is preferably attached to the central region 37 of the diaphragm with an epoxy resin adhesive glass or with another strong bonding agent. The diaphragm assembly preferably is attached at its flanged rim 38 to a pressure adapter (not shown) in such a way that a pressure medium can apply pressure from the back side of the diaphragm facing downwardly in FIG. 4. A transducer header (not shown) may then be attached to the assembly from the front side facing upwardly in FIG. 4. The transducer may be completed by wiring, compensation, testing and sealing.

Within the scope of the subject invention, the diffused strain gages could be of the P-type diffused in N-type substrate or N-type diffused in a P-type substrate. However, provision of P-type diffused silicon strain gages is presently preferred for greater linearlity with change in temperature.

The following method may be employed for realizing the strain gage asemblies according to the subject invention.

In particular, a silicon wafer polished from both sides and of the above mentioned (1-1-0) plane orientation is oxidized in a conventional manner preparatory to photolithography. The requisite photoresist material is applied to one of the polished wafer surface and is exposed through a mask defining the gage pattern in such a way that the strain gages are oriented in the above mentioned desired crystallographic directions shown, for instance, in FIGS. 2 and 3.

As may be seen from FIG. 1, each of the strain gages 12, 16, 21 and 22 extends in a boustrophedonic pattern in which the thin strain gage resistor portions 45 are interconnected at the boustrophedonic turns by thickened connector portions that are relatively insensitive to strain. In other words, the above mentioned dominent dimension 13 of orientation of the strain gage 12 is the longitudinal dimension of the elongate strain gage resistors 45 which, in the strain gages 12 and 21, extend in the direction 14 shown in FIG. 1 and, in terms of FIG. 2, in the crystallographic direction $<\bar{1}\text{-}1\text{-}0>$ or, in terms of FIG. 3, in the direction $<1\text{-}\bar{1}\text{-}1>$, of the (1-1-0) plane 26.

Conversely, the elongate strain gage resistors of gages 16 and 22 have their longitudinal dimension as their dominant dimension 17, extending in the direction 18 shown in FIG. 1 and, in terms of FIG. 2, in the crystallographic direction $<1\text{-}0\text{-}0>$ or, in terms of FIG. 3, the direction $<\bar{1}\text{-}1\text{-}2>$ in the (1-1-0) plane 26 of the cubic unit cell 24.

Of course, gage patterns other than the boustrophedonic configurations shown in FIG. 1 may be employed for implementing the teachings of the subject invention, including those illustrated in FIGS. 2 and 3. According to the currently discussed aspect of the subject invention, the substrate of semiconductor material 10 is provided with a maximum value of piezoresistive coefficient in the first direction 14, $<\bar{1}\text{-}1\text{-}0>$, or $<1\text{-}\bar{1}\text{-}1>$, and with a minimum value of piezoresistive coefficient in the second direction 18, $<1\text{-}0\text{-}0>$, or $<\bar{1}\text{-}1\text{-}2>$, whereby adjacent gages exhibit opposite resistance changes in response to strains imposed on the substrate 10.

As shown in FIG. 1, and generally within the scope of the illustrated preferred embodiments, the four strain gages of a full bridge, or the two strain gages of a half bridge, are preferably provided in essentially identical geometries or patterns, at least as far as the strain sensitive elements 45 of the gages are concerned.

After the photoresist has been exposed through a mask in the manner disclosed above with the aid of FIG. 1, that exposed photoresist is developed and cured, preparatory to the etching step, after which the superfluous photoresist is stripped off the wafer.

For the manufacture of P-type strain gages in a N-type substrate, a P-type dopant is diffused in a conventional manner at a suitable temperature and for a suitable time to define surface concentration and junction depth of the diffused gages 12, 16, 21 and 22.

Protective oxide is then grown on the diffused gages, so that open contact windows may be provided by photolithography and etching in the protective oxide coating where needed, especially at the terminals or pads 44 to 49. In a similar way, contact windows are etched and aluminum or other suitable metallization may then be deposited on the surface and contact areas may be defined thereon by photolithography and etching.

Multitudes of the strain gage patterns shown in FIG. 1 may be prepared on a single wafer, and may then be separated into individual chips.

For this purpose, grooves with defined depth may be etched into the wafer along a grid pattern from the front side, and the back side of the wafer may be etched until the grooves along the grid pattern are visible.

In practice, this may be done while the wafer is mounted face down with wax on a stainless steel or other suitable carrier.

The wax may then be dissolved and individual small thin substrates 10 with sets of diffused gages 12, 16, 21 and 22 may then be separated from each other and cleaned preparatory to individual bonding to the central diaphragm portion 37, as explained above with the aid of FIG. 4.

The subject extensive disclosure will suggest or render apparent to those skilled in the art various modifications and variations within the spirit and scope of the subject invention and of equivalents thereof.

I claim:

1. In a method of making a sensing device, including the step of providing a substrate of semiconductor material having cubic unit cells and an absolute value of piezoresistive coefficient in a first direction different from an absolute value of piezoresistive coefficient in a second direction transverse to said first direction, the improvement comprising in combination with said step the steps of:

providing a first strain gage with a dominant dimension oriented in said first direction and diffusing said first strain gage into said substrate;

providing a second strain gage with a dominant dimension in said second direction and diffusing said second strain gage into said substrate;

providing a pressure responsive diaphragm having a central area displaying essentially symmetrical biaxial strains;

said first and second strain gages being located within an area of said substrate corresponding to said central area of said diaphragm displaying essentially symmetrical biaxial strains; and attaching said substrate in said area to the diaphragm at an orientation exposing said gages to said biaxial strains.

2. A method as claimed in claim 1, wherein:
said substrate is provided at a crystallographic orientation defined by a diagonal plane through a cubic unit cell intersecting two opposite edges of said unit cell;

one of said gages is oriented in said diagonal plane in parallel to one of said edges of said cubic unit cell; and the other gage is oriented in said diagonal plane in parallel to an intersection of said diagonal plane with a side of said cubic unit cell.

3. A method as claimed in claim 1, wherein:
said substrate is provided at a crystallographic orientation defined by a diagonal plane through a cubic unit cell intersecting two opposite edges of said unit cell;

one of said gages is oriented in said diagonal plane in parallel to a body diagonal of said cubic unit cell; and the other gage is oriented in said diagonal plane at right angles to said one gage.

4. A method as claimed in claim 1, including the steps of:

providing a third strain gage with a dominant dimension oriented in said first direction and diffusing said third strain gage into said substrate;

providing a fourth strain gage with a dominant dimension oriented in said second direction and diffusing said fourth strain gage into said substrate; and said third and fourth strain gages being also located within said area of said substrate corresponding to said central area of said diaphragm displaying essentially symmetrical biaxial strains.

5. A method as claimed in claim 4, wherein:
said substrate is provided at a crystallographic orientation defined by a diagonal plane through a cubic unit cell intersecting two opposite edges of said unit cell;

said first and third strain gages are oriented in said diagonal plane in parallel to an intersection of said diagonal plane with a side of said cubic unit cell; and said second and fourth strain gages are oriented in said diagonal plane in parallel to one of said edges of said cubic unit cell.

6. A method as claimed in claim 5, wherein:
said second strain gage is located adjacent said first strain gage;

said third strain gage is located adjacent said second strain gage and across from said first strain gage;

said fourth strain gage is located across from said second strain gage; and said first strain gage is located adjacent said fourth strain gage.

7. A method as claimed in claim 4, wherein:
said substrate is provided at a crystallographic orientation defined by a diagonal plane through a cubic unit cell intersecting two opposite edges of said unit cell;

said first and third strain gages are oriented in said diagonal plane in parallel to a body diagonal of said cubic unit cell; and said second and fourth strain gages are oriented in said diagonal plane at right angles to said first and third strain gages.

8. A method as claimed in claim 7, wherein:
said second strain gage is located adjacent said first strain gage;

said third strain gage is located adjacent said second strain gage and across from said first strain gage;

said fourth strain gage is located across from said second strain gage; and said first strain gage is located adjacent said fourth strain gage.

9. A method as claimed in claim 1, including the step of:

providing said substrate in the form of a chip located in and bonded to a center region of said diaphragm including said area.

10. A method as claimed in claim 1, wherein:

said substrate of semiconductor material is provided with a maximum value of piezoresistive coefficient in said first direction and with a minimum value of piezoresistive coefficient in said second direction.

11. A method as claimed in claim 1, wherein:

said strain gages are provided in essentially identical geometries.

12. In a sensing device, a substrate of semiconductor material having cubic unit cells and an absolute value of piezoresistive coefficient in a first direction different from an absolute value of piezoresistive coefficient in a second direction transverse to said first direction, the improvement comprising in combination:

a first strain gage having a dominant dimension oriented in said first direction and being diffused into said substrate;

a second strain gage having a dominant dimension in said second direction and being diffused into said substrate;

a pressure responsive diaphragm having a central area displaying essentially symmetrical biaxial strains;

said first and second strain gages located within an area of said substrate corresponding to said central area of said diaphragm displaying essentially symmetrical biaxial strains; and means for affixing said substrate to said diaphragm in said central area at an orientation exposing said gages to said biaxial strains.

13. A sensing device as claimed in claim 12, wherein:

said substrate has a crystallographic orientation defined by a diagonal plane through a cubic unit cell intersecting two opposite edges of said unit cell;

one of said gages is oriented in said diagonal plane in parallel to one of said edges of said cubic unit cell; and the other gage is oriented in said diagonal plane in parallel to an intersection of said diagonal plane with a side of said cubic unit cell.

14. A sensing device as claimed in claim 12, wherein:

said substrate has a crystallographic orientation defined by a diagonal plane through a cubic unit cell intersecting two opposite edges of said unit cell;

one of said gages is oriented in said diagonal plane in parallel to a body diagonal of said cubic unit cell; and the other gage is oriented in said diagonal plane at right angles to said one gage.

15. A sensing device as claimed in claim 12, including:

a diffused third strain gage oriented with a dominant dimension in said first direction;

a diffused fourth strain gage oriented with a dominant dimension in said second direction; and said third and fourth strain gages also located within said area of said substrate corresponding to said central area of said diaphragm displaying essentially symmetrical biaxial strains.

16. A sensing device as claimed in claim 15, wherein:

said substrate has a crystallographic orientation defined by a diagonal plane through cubic unit cell intersecting two opposite edges of said unit cell;

said first and third strain gages are oriented in said diagonal plane in parallel to an intersection of said diagonal plane with a side of said cubic unit cell; and said second and fourth strain gages are oriented in said diagonal plane in parallel to one of said edges of said cubic unit cell.

17. A sensing device as claimed in claim 16, wherein:

said second strain gage is adjacent said first strain gage;

said third strain gage is adjacent said second strain gage and across from said first strain gage;

said fourth strain gage is across from said second strain gage; and said first strain gage is adjacent said fourth strain gage.

18. A sensing device as claimed in claim 15, wherein:

said substrate has a crystallographic orientation defined by a diagonal plane through a cubic unit cell intersecting two opposite edges of said unit cell;

said first and third strain gages are oriented in said diagonal plane in parallel to a body diagonal of said cubic unit cell; and said second and fourth strain gages are oriented in said diagonal plane at right angles to said first and second gage resistors.

19. A sensing device as claimed in claim 18, wherein:

said second strain gage is adjacent said first strain gage;

said third strain gage is adjacent said second strain gage and across from said first strain gage;

said fourth strain gage is across from said second strain gage; and said first strain gage is adjacent said fourth strain gage.

20. A sensing device as claimed in claim 12, wherein:

said substrate is a chip bonded to a center region of said diaphragm including said area.

21. A sensing device as claimed in claim 12, wherein:

said substrate of semiconductor material has a maximum value of piezoresistive coefficient in said first direction and a minimum value of piezoresistive coefficient in said second direction.

22. A sensing device as claimed in claim 12, wherein:

said strain gages have essentially identical geometries.

* * * * *